(12) United States Patent
Bergman et al.

(10) Patent No.: US 11,674,758 B2
(45) Date of Patent: Jun. 13, 2023

(54) AIRCRAFT HEAT EXCHANGERS AND PLATES

(71) Applicant: Raytheon Technologies Corporation, Farmington, CT (US)

(72) Inventors: Russell J. Bergman, South Windsor, CT (US); William D. Blickenstaff, Port Saint Lucie, FL (US); James F. Wiedenhoefer, Windsor, CT (US); Scott D. Virkler, Ellington, CT (US); Jason D. Liles, Port Saint Lucie, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 155 days.

(21) Appl. No.: 17/124,790

(22) Filed: Dec. 17, 2020

(65) Prior Publication Data

US 2021/0222963 A1 Jul. 22, 2021

Related U.S. Application Data

(60) Provisional application No. 62/963,070, filed on Jan. 19, 2020.

(51) Int. Cl.
*F28F 3/12* (2006.01)
*F28F 9/02* (2006.01)
(Continued)

(52) U.S. Cl.
CPC .............. *F28F 3/12* (2013.01); *F28D 9/0081* (2013.01); *F28F 9/0202* (2013.01);
(Continued)

(58) Field of Classification Search
CPC .. F02K 3/115; F02C 7/185; F02C 7/16; F28F 3/12; F28F 9/0263; F28F 2009/029;
(Continued)

(56) References Cited

U.S. PATENT DOCUMENTS 2,792,200 A * 5/1957 Huggins ................. F28F 3/025
165/125
2,918,043 A * 12/1959 Ackerman ............... F24H 1/38
122/225 R
(Continued)

FOREIGN PATENT DOCUMENTS

CN 101309577 A 11/2008
CN 108869044 A 11/2018
(Continued)

OTHER PUBLICATIONS

International Search Report and Written Opinion dated Mar. 31, 2021 for PCT/US21/13804.
(Continued)

*Primary Examiner* — Paul Alvare
(74) *Attorney, Agent, or Firm* — Bachman & LaPointe, P.C.

(57) ABSTRACT

A heat exchanger plate for provides heat transfer between a first flow along a first flowpath and a second flow along a second flowpath. The heat exchanger plate comprised a body having: a first face and a second face opposite the first face; a leading edge along the second flowpath and a trailing edge along the second flowpath; a proximal edge having at least one inlet port along the first flowpath and at least one outlet port along the first flowpath; and at least one passageway along the first flowpath. Along a proximal portion, the first face and the second face converge at a first angle. Along a distal portion, the first face and the second face converge at a second angle less than the first angle.

23 Claims, 11 Drawing Sheets

(51) Int. Cl.
*F28F 13/08* (2006.01)
*F28D 9/00* (2006.01)

(52) U.S. Cl.
CPC .......... *F28D 9/0018* (2013.01); *F28F 9/0263* (2013.01); *F28F 13/08* (2013.01); *F28F 2009/029* (2013.01)

(58) Field of Classification Search
CPC ...... F28F 13/08; F28D 9/0081; F28D 9/0018; F05D 2260/22141
See application file for complete search history.

(56) References Cited

U.S. PATENT DOCUMENTS

| | | | |
|---|---|---|---|
| 3,552,488 | A | 1/1971 | Grill et al. |
| 3,818,984 | A * | 6/1974 | Nakamura ............... F28F 3/025 165/157 |
| 4,438,809 | A * | 3/1984 | Papis ................... F28D 9/0018 165/166 |
| 4,520,868 | A | 6/1985 | Grawey |
| 4,527,622 | A * | 7/1985 | Weber .................... F28F 3/025 165/166 |
| 4,574,872 | A * | 3/1986 | Yano ....................... F28D 19/04 165/DIG. 18 |
| 4,715,431 | A | 12/1987 | Schwarz et al. |
| 5,004,044 | A * | 4/1991 | Horgan ................... F28F 3/083 165/145 |
| 5,009,263 | A | 4/1991 | Seshimo et al. |
| 5,107,922 | A | 4/1992 | So |
| 5,531,268 | A | 7/1996 | Hoshino et al. |
| 5,718,127 | A | 2/1998 | Aitken |
| 6,134,880 | A | 10/2000 | Yoshinaka |
| 6,430,931 | B1 | 8/2002 | Horner |
| 6,607,026 | B1 | 8/2003 | Naji et al. |
| 7,334,411 | B2 | 2/2008 | Vandermolen |
| 7,770,633 | B2 | 8/2010 | Miyahara |
| 7,784,528 | B2 | 8/2010 | Ottow et al. |
| 7,861,512 | B2 | 1/2011 | Olver et al. |
| 7,950,149 | B2 | 5/2011 | Golecki |
| 8,181,443 | B2 | 5/2012 | Rago |
| 8,266,888 | B2 | 9/2012 | Liu |
| 8,387,362 | B2 | 3/2013 | Storage et al. |
| 8,438,835 | B2 | 5/2013 | Perveiler et al. |
| 8,573,291 | B2 | 11/2013 | Vick |
| 8,689,547 | B2 | 4/2014 | Burgers et al. |
| 8,770,269 | B2 | 7/2014 | Scott |
| 8,784,047 | B2 | 7/2014 | Elder |
| 9,200,855 | B2 | 12/2015 | Kington et al. |
| 9,243,563 | B2 | 1/2016 | Lo |
| 9,328,968 | B2 | 5/2016 | Vanderwees |
| 9,377,250 | B2 | 6/2016 | Landre |
| 9,732,702 | B2 | 8/2017 | Ueda |
| 9,752,803 | B2 | 9/2017 | Matter, III et al. |
| 9,766,019 | B2 | 9/2017 | Eleftheriou et al. |
| 9,771,867 | B2 | 9/2017 | Karam et al. |
| 9,816,766 | B2 | 11/2017 | Miller et al. |
| 9,835,043 | B2 | 12/2017 | Kantany et al. |
| 9,851,159 | B2 | 12/2017 | Cameron |
| 9,909,812 | B2 | 3/2018 | Peskos et al. |
| 9,982,630 | B2 | 5/2018 | Marini et al. |
| 10,041,741 | B2 | 8/2018 | Turcotte et al. |
| 10,100,740 | B2 | 10/2018 | Thomas |
| 10,125,684 | B2 | 11/2018 | Yu |
| 10,175,003 | B2 | 1/2019 | Sennoun et al. |
| 10,184,400 | B2 | 1/2019 | Cerny et al. |
| 10,208,621 | B2 | 2/2019 | Hoefler et al. |
| 10,222,142 | B2 * | 3/2019 | Alvarez ................. B33Y 80/00 |
| 10,316,750 | B2 | 6/2019 | Loebig et al. |
| 10,422,585 | B2 | 9/2019 | Jensen et al. |
| 10,480,407 | B2 | 11/2019 | Alecu |
| 10,926,364 | B2 | 2/2021 | Thresher |
| 11,219,841 | B2 | 1/2022 | Wan et al. |
| 2001/0018024 | A1 | 8/2001 | Hyde et al. |
| 2004/0026072 | A1 | 2/2004 | Yi et al. |
| 2004/0040153 | A1 | 3/2004 | Ashida et al. |
| 2004/0083712 | A1 * | 5/2004 | Dewis .................. F28D 9/0018 60/39.511 |
| 2004/0111829 | A1 | 6/2004 | Bruno et al. |
| 2008/0095611 | A1 * | 4/2008 | Storage ................... F28F 1/022 415/116 |
| 2008/0283234 | A1 | 11/2008 | Sagi et al. |
| 2009/0169359 | A1 | 7/2009 | Murphy et al. |
| 2010/0044022 | A1 * | 2/2010 | Bharani ................ F28F 9/0263 165/174 |
| 2010/0084120 | A1 | 4/2010 | Yin et al. |
| 2010/0170262 | A1 | 7/2010 | Kaslusky et al. |
| 2011/0088405 | A1 | 4/2011 | Turco |
| 2011/0146944 | A1 | 6/2011 | Hand et al. |
| 2011/0168366 | A1 | 7/2011 | Garret et al. |
| 2012/0216544 | A1 * | 8/2012 | Eleftheriou ............... F02C 7/10 60/39.511 |
| 2012/0318473 | A1 * | 12/2012 | Nishikawa .......... F28D 1/05391 165/41 |
| 2013/0199152 | A1 | 8/2013 | Menheere et al. |
| 2013/0199288 | A1 * | 8/2013 | Goenka ................ F28F 9/0263 73/202 |
| 2013/0213623 | A1 | 8/2013 | Perocchio et al. |
| 2014/0246179 | A1 | 9/2014 | Vallee et al. |
| 2015/0047818 | A1 | 2/2015 | Peskos et al. |
| 2015/0047820 | A1 | 2/2015 | Rhoden |
| 2016/0069266 | A1 | 3/2016 | Murphy et al. |
| 2016/0123230 | A1 * | 5/2016 | Thomas .................. F02K 3/115 60/39.83 |
| 2016/0177828 | A1 | 6/2016 | Snyder et al. |
| 2016/0230669 | A1 | 8/2016 | Selstad et al. |
| 2016/0362999 | A1 | 12/2016 | Ho |
| 2017/0009703 | A1 | 1/2017 | Moon et al. |
| 2017/0184024 | A1 | 6/2017 | Sennoun |
| 2017/0363361 | A1 | 12/2017 | Turney |
| 2018/0051935 | A1 | 2/2018 | Roberge |
| 2018/0058472 | A1 * | 3/2018 | Tajiri ....................... F02C 7/18 |
| 2018/0094583 | A1 * | 4/2018 | Carretero Benignos ..................... F28D 7/005 |
| 2018/0172368 | A1 | 6/2018 | Kowalski et al. |
| 2018/0238238 | A1 * | 8/2018 | Luschek ................... F28F 1/26 |
| 2018/0238630 | A1 | 8/2018 | Pollard et al. |
| 2018/0244127 | A1 * | 8/2018 | Sennoun .................. F28F 7/02 |
| 2018/0245853 | A1 * | 8/2018 | Sennoun .................. F28F 7/02 |
| 2018/0258859 | A1 | 9/2018 | Suciu et al. |
| 2018/0292140 | A1 | 10/2018 | Mayo et al. |
| 2018/0328285 | A1 | 11/2018 | Tajiri et al. |
| 2019/0154345 | A1 | 5/2019 | Martinez et al. |
| 2019/0170445 | A1 | 6/2019 | McCaffrey |
| 2019/0170455 | A1 | 6/2019 | McCaffrey |
| 2019/0204012 | A1 * | 7/2019 | Army .................... F28D 9/0012 |
| 2019/0212074 | A1 | 7/2019 | Lockwood et al. |
| 2019/0234690 | A1 | 8/2019 | Sobolak et al. |
| 2019/0277571 | A1 | 9/2019 | Disori et al. |
| 2019/0277579 | A1 | 9/2019 | Disori et al. |
| 2019/0293365 | A1 | 9/2019 | Disori et al. |
| 2019/0293366 | A1 | 9/2019 | Disori et al. |
| 2019/0310030 | A1 | 10/2019 | Disori et al. |
| 2019/0339012 | A1 | 11/2019 | Disori et al. |
| 2020/0189046 | A1 | 6/2020 | Ravindranath et al. |
| 2020/0347737 | A1 | 11/2020 | Bordoni |
| 2020/0395890 | A1 | 12/2020 | Hutting et al. |
| 2021/0054787 | A1 * | 2/2021 | Ueda ......................... F28F 3/12 |
| 2021/0207535 | A1 | 7/2021 | Bergman et al. |
| 2021/0222624 | A1 | 7/2021 | Wiedenhoefer et al. |
| 2021/0222962 | A1 | 7/2021 | Wiedenhoefer et al. |
| 2021/0285375 | A1 | 9/2021 | Wiedenhoefer et al. |
| 2021/0318071 | A1 | 10/2021 | Hart et al. |

FOREIGN PATENT DOCUMENTS

| | | | | |
|---|---|---|---|---|
| EP | 2165755 | A1 * | 3/2010 | ............ B01J 19/249 |
| FR | 3075870 | A1 | 6/2019 | |
| GB | 2343641 | A * | 5/2000 | ............ F28D 9/0018 |
| JP | 62232867 | A * | 10/1987 | ............ F28F 13/08 |
| JP | H0961084 | A | 3/1997 | |
| JP | 11-148793 | A | 6/1999 | |

(56) References Cited

FOREIGN PATENT DOCUMENTS

| WO | WO-2014201311 A1 * | 12/2014 | ............. F02C 7/185 |
| WO | 2021/138307 A1 | 7/2021 | |
| WO | 2021/146674 A1 | 7/2021 | |

OTHER PUBLICATIONS

European Search Report dated Feb. 7, 2022 for European Patent Application No. 21740964.8 (EP stage of PCT/US2021/013804-WO/2021/146674).
U.S. Office Action dated Dec. 13, 2021 for U.S. Appl. No. 17/124,551.
International Search Report and Written Opinion dated Mar. 19, 2021 for PCT/US20/67289.
European Search Report dated Nov. 25, 2021 for European Patent Application No. 20910078.3 (EP stage of PCT/US2020/067289-WO/2021/138307).
European Search Report dated Nov. 19, 2021 for European Patent Application No. 21191780.2 (divisional of EP stage of PCT/US2020/067289-WO/2021/138307).
U.S. Office Action dated Apr. 26, 2022 for U.S. Appl. No. 17/137,946.
Chris Wiegand et al., "F-35 Air Vehicle Technology Overview", Aviation Technology, Integration, and Operations Conference, Jun. 2018, American Institute of Aeronautics and Astronautics, Inc., Reston, Virginia.
Jonathan Lowell, "Keeping Cool over Salt Lake", Aug. 25, 2019, U.S. Air Force, Washington, DC, retrieved from Internet Nov. 9, 2019 https://www.af.mil/News/Commentaries/Display/Article/1941943/keeping-cool-over-salt-ake/.
Sean Robert Nuzum, Thesis: "Aircraft Thermal Management using Liquefied Natural Gas", Apr. 27, 2016, Wright State University, Dayton, Ohio.
U.S. Office Action dated Nov. 9, 2021 for U.S. Appl. No. 17/139,174.
European Search Report and Opinion dated Oct. 20, 2021 for European Patent Application No. 20218011.3.
Extended European Search Report dated Mar. 31, 2022 for European Patent Application No. 20910078.3 (EP stage of PCT/US20/67289-WO/2021/138307).
Extended European Search Report dated Mar. 31, 2022 for European Patent Application No. 21191780.2 (EP divisional of PCT/US20/67289-WO/2021/138307).

* cited by examiner

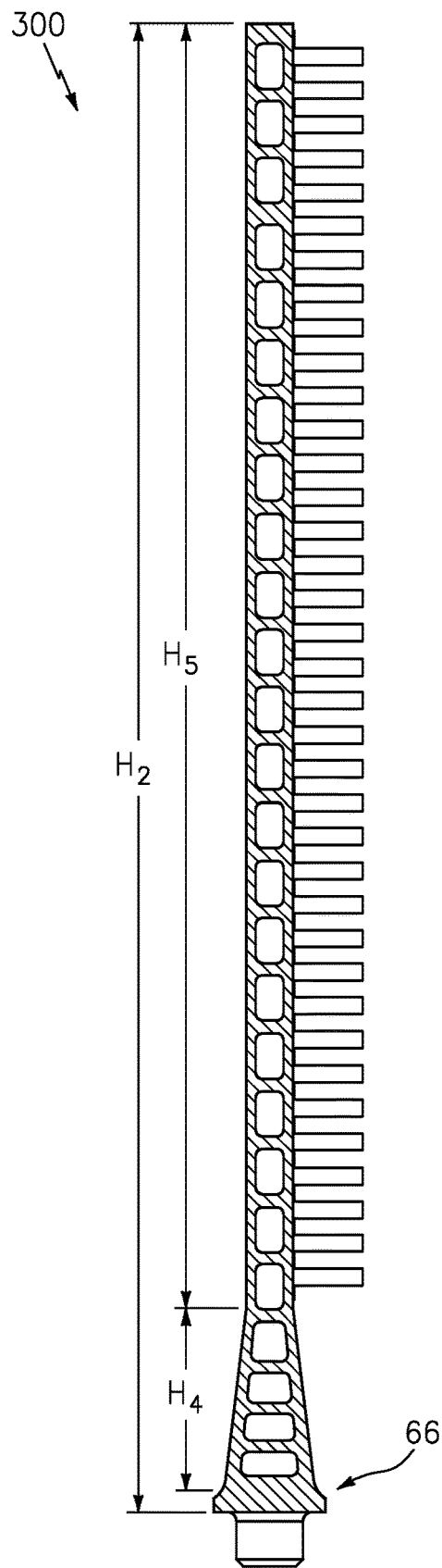
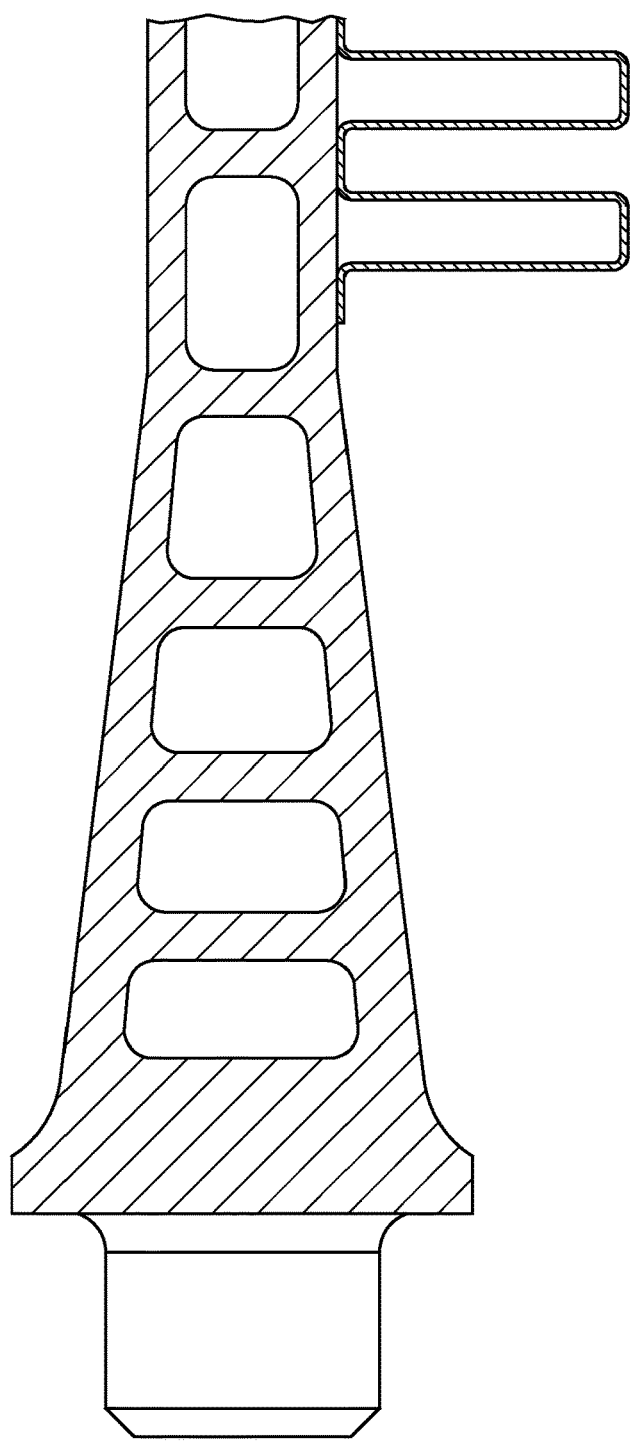
FIG. 9
FIG. 9A

AIRCRAFT HEAT EXCHANGERS AND PLATES

CROSS-REFERENCE TO RELATED APPLICATION

Benefit is claimed of U.S. Patent Application No. 62/963,070, filed Jan. 19, 2020, and entitled "Aircraft Heat Exchangers and Plates", the disclosure of which is incorporated by reference herein in its entirety as if set forth at length.

BACKGROUND

The disclosure relates to gas turbine engine heat exchangers. More particularly, the disclosure relates to air-to-air heat exchangers.

Examples of gas turbine engine heat exchangers are found in: United States Patent Application Publication 20190170445A1 (the '445 publication), McCaffrey, Jun. 6, 2019, "HIGH TEMPERATURE PLATE FIN HEAT EXCHANGER"; United States Patent Application Publication 20190170455A1 (the '455 publication), McCaffrey, Jun. 6, 2019, "HEAT EXCHANGER BELL MOUTH INLET"; and United States Patent Application Publication 20190212074A1 (the '074 publication), Lockwood et al., Jul. 11, 2019, "METHOD FOR MANUFACTURING A CURVED HEAT EXCHANGER USING WEDGE SHAPED SEGMENTS", the disclosures of which three publications are incorporated by reference in their entireties herein as if set forth at length.

An exemplary positioning of such a heat exchanger provides for the transfer of thermal energy from a flow (heat donor flow) diverted from an engine core flow to a bypass flow (heat recipient flow). For example, air is often diverted from the compressor for purposes such as cooling. However, the act of compression heats the air and reduces its cooling effectiveness. Accordingly, the diverted air may be cooled in the heat exchanger to render it more suitable for cooling or other purposes. One particular example draws the heat donor airflow from a diffuser case downstream of the last compressor stage upstream of the combustor. This donor flow transfers heat to a recipient flow which is a portion of the bypass flow. To this end, the heat exchanger may be positioned within a fan duct or other bypass duct. The cooled donor flow is then returned to the engine core (e.g., radially inward through struts) to pass radially inward of the gas path and then be passed rearward for turbine section cooling including the cooling of turbine blades and vanes. The heat exchanger may conform to the bypass duct. The bypass duct is generally annular. Thus, the heat exchanger may occupy a sector of the annulus up to the full annulus.

Other heat exchangers may carry different fluids and be in different locations. For example, instead of rejecting heat to an air flow in a bypass duct, other heat exchangers may absorb heat from a core flow (e.g., as in recuperator use). Among further uses for heat exchangers in aircraft are power and thermal management systems (PTMS) also known as integrated power packages (IPP). One example is disclosed in United States Patent Application publication 20100170262A1, Kaslusky et al., Jul. 8, 2010, "AIRCRAFT POWER AND THERMAL MANAGEMENT SYSTEM WITH ELECTRIC CO-GENERATION". Another example is disclosed in United States Patent Application publication 20160362999A1, Ho, Dec. 15, 2016, "EFFICIENT POWER AND THERMAL MANAGEMENT SYSTEM FOR HIGH PERFORMANCE AIRCRAFT". Another example is disclosed in United States Patent Application publication 20160177828A1, Snyder et al., Jun. 23, 2016, "STAGED HEAT EXCHANGERS FOR MULTI-BYPASS STREAM GAS TURBINE ENGINES".

U.S. Pat. No. 10,100,740 (the '740 patent, the disclosure of which is incorporated by reference in its entirety herein as if set forth at length), to Thomas, Oct. 16, 2018, "Curved plate/fin heater exchanger", shows attachment of a square wave form fin array to the side of a heat exchanger plate body. For plates in a radial array, the wave amplitude progressively increases to accommodate a similar increase in inter-plate spacing.

SUMMARY

One aspect of the disclosure involves a heat exchanger for providing heat transfer between a first flow along a first flowpath and a second flow along an arcuate second flowpath. The heat exchanger has: an inlet manifold having at least one inlet port and at least one outlet port; an outlet manifold having at least one outlet port and at least one inlet port; and at least one plate bank. The at least one plate bank has a plurality of plates, each plate comprising a body mounted to the inlet manifold and the outlet manifold and having: at least one inlet port along the first flowpath and at least one outlet port along the first flowpath; a first face and a second face opposite the first face; a leading edge along the second flowpath and a trailing edge along the second flowpath; an inner diameter edge; and an outer diameter edge, a thickness of the body between the first face and second face tapering along a first region in an inward radial direction from the outer diameter edge to the inner diameter edge. The plate bank includes fin arrays between adjacent said plates spanning between the first face in the first region of one said plate and the second face in the first region of the other said plate, the fin arrays each formed by a wave form sheet metal piece having essentially uniform wave amplitude.

In a further embodiment of any of the foregoing embodiments, additionally and/or alternatively, for each plate of the plurality of plates the at least one inlet port and at least one outlet port are along one of the inner diameter edge and the outer diameter edge.

In a further embodiment of any of the foregoing embodiments, additionally and/or alternatively, for each plate of the plurality of plates the inlet manifold and outlet manifold are portions of a combined manifold structure.

In a further embodiment of any of the foregoing embodiments, additionally and/or alternatively, the combined manifold structure is arcuate having a concave inner diameter face, the plates mounted to the inner diameter face.

In a further embodiment of any of the foregoing embodiments, additionally and/or alternatively, for each plate of the plurality of plates the at least one inlet port and at least one outlet port are along the outer diameter edge.

In a further embodiment of any of the foregoing embodiments, additionally and/or alternatively, for each plate of the plurality of plates, the at least one inlet port and at least one outlet port are along the outer diameter edge.

Another aspect of the disclosure involves a gas turbine engine including the heat exchanger of any of the foregoing embodiments and further comprising a bypass flowpath forming the second flowpath.

Another aspect of the disclosure involves a method for using the heat exchanger of any of the foregoing embodiments. The method comprises: passing the first flow along the first flowpath; and passing the second flow along the second flowpath to transfer said heat from the first flow to the second flow.

In a further embodiment of any of the foregoing embodiments, additionally and/or alternatively, the second flow passes along the plate first faces and plate second faces.

Another aspect of the disclosure involves a heat exchanger plate for providing heat transfer between a first flow along a first flowpath and a second flow along a second flowpath. The heat exchanger plate comprises a body having: a first face and a second face opposite the first face; a leading edge along the second flowpath and a trailing edge along the second flowpath; a proximal edge having at least one inlet port along the first flowpath and at least one outlet port along the first flowpath; and at least one passageway along the first flowpath. Along at least 8.0% of a height between the proximal edge and the distal edge, the first face and the second face converge at a first angle of at least 0.25°.

In a further embodiment of any of the foregoing embodiments, additionally and/or alternatively, said at least 8.0% of a height between the proximal edge and the distal edge is a continuous zone and the first angle is uniform along said continuous zone.

In a further embodiment of any of the foregoing embodiments, additionally and/or alternatively, the plate has a plurality of interior walls separating legs of the at least one passageway at a progressively increasing spacing from proximal to distal.

In a further embodiment of any of the foregoing embodiments, additionally and/or alternatively, along at least 50% of a height between the proximal edge and the distal edge, the first face and the second face converge at a first angle of between 0.25° and 5.0°.

In a further embodiment of any of the foregoing embodiments, additionally and/or alternatively, the passageway comprises: an inlet plenum extending from the at least one inlet port of the plate; an outlet plenum extending to the at least one outlet port of the plate; and a plurality of legs in parallel between the inlet plenum and the outlet plenum.

In a further embodiment of any of the foregoing embodiments, additionally and/or alternatively: the inlet plenum is adjacent the trailing edge; and the outlet plenum is adjacent the leading edge.

Another aspect of the disclosure involves a heat exchanger plate for providing heat transfer between a first flow along a first flowpath and a second flow along a second flowpath. The heat exchanger plate comprised a body having: a first face and a second face opposite the first face; a leading edge along the second flowpath and a trailing edge along the second flowpath; a proximal edge having at least one inlet port along the first flowpath and at least one outlet port along the first flowpath; and at least one passageway along the first flowpath. Along a proximal portion, the first face and the second face converge at a first angle. Along a distal portion, the first face and the second face converge at a second angle less than the first angle.

In a further embodiment of any of the foregoing embodiments, additionally and/or alternatively: along the proximal portion, the body has integral fins; and along the distal portion, the plate has sheetmetal fins secured to the body.

In a further embodiment of any of the foregoing embodiments, additionally and/or alternatively, the first angle is at least 0.25° greater than the second angle.

In a further embodiment of any of the foregoing embodiments, additionally and/or alternatively, the second angle is 0.0°.

In a further embodiment of any of the foregoing embodiments, additionally and/or alternatively, the proximal portion extends for a height of at least 8% of a height from the proximal edge.

In a further embodiment of any of the foregoing embodiments, additionally and/or alternatively, along the proximal portion, the plate has a plurality of walls at a progressively increasing spacing from proximal to distal.

In a further embodiment of any of the foregoing embodiments, additionally and/or alternatively, along the distal portion, the plate has a plurality of walls at a constant spacing.

In a further embodiment of any of the foregoing embodiments, additionally and/or alternatively, the body comprises a cast substrate.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 9 is a transverse sectional view of the second alternative plate taken along line 9-9.

FIG. 9A is an enlarged view of a proximal edge portion of the second alternative plate.

Like reference numbers and designations in the various drawings indicate like elements.

DETAILED DESCRIPTION

Figure 1:
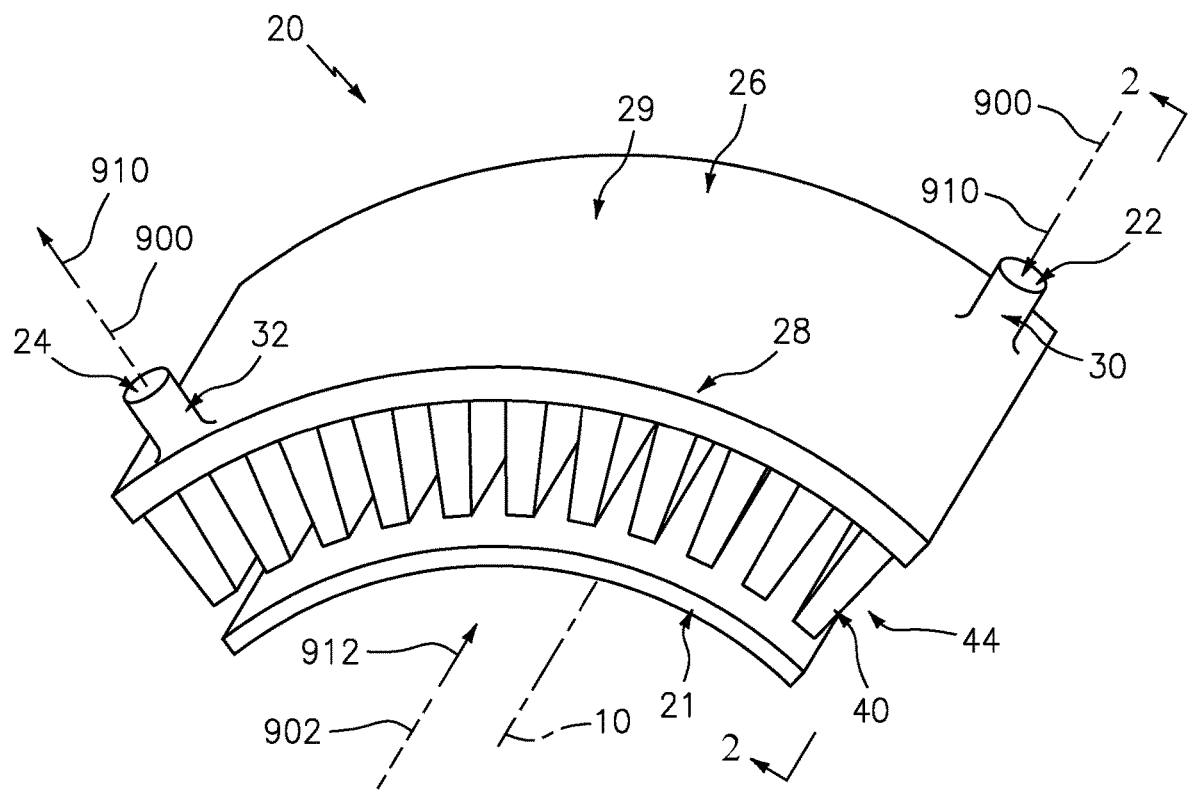
FIG. 1 is a schematic view of a heat exchanger.

FIG. 1 shows a gas turbine engine heat exchanger 20 providing heat exchange between a first flowpath 900 and a second flowpath 902 and thus between their respective first and second fluid flows 910 and 912. In the exemplary embodiment, the flowpaths 900, 902 are gas flowpaths passing respective gas flows 910, 912. In the illustrated example, the first flow 910 enters the heat exchanger 20 as a single piped flow and exits as a single piped flow 910; whereas the flow 912 is sector portion of an axial annular flow surrounding a central longitudinal axis (centerline) 10 of the heat exchanger and associated engine. For purposes of schematic illustration, the exemplary heat exchanger 20 is shown shaped to occupy essentially one quarter of a 360° annulus surrounding an inner member 21 such as an engine core. There may be multiple such heat exchangers occupying the full annulus or one or more such heat exchangers occupying only a portion of the annulus.

Other connections are also possible. For example, a configuration with a single first flow inlet and branched first flow outlets is shown in copending U.S. Patent Application No. 62/957,091 (the '091 application), filed Jan. 3, 2020, and entitled "Aircraft Heat Exchanger Assembly", the disclosure of which is incorporated by reference herein in its entirety as if set forth at length.

The heat exchanger 20 has an inlet 22 and outlet 24 for the first flow. The exemplary inlet and outlet are, respectively, ports of an inlet manifold 26 (FIG. 2) and an outlet manifold 28 (discussed below) formed as portions of a single combined manifold unit 29 in the example. Exemplary manifolds are metallic (e.g., nickel-based superalloy). The inlet manifold and outlet manifold may each have a respective fitting 30, 32 providing the associated port 22, 24. As is discussed further below, the inlet manifold and outlet manifold are coupled to heat exchanger plates of one or more exemplary plate banks 40.

Each plate bank 40 comprises a circumferential array of plates 44 (discussed further below). In the exemplary banks, the plates extend axially and radially relative to the axis 10. Thus, the plates diverge from each other in the outward radial direction. Each plate has an inlet port 46 and an outlet port 48. Exemplary ports 46, 48 are mated to sockets in an inner diameter (ID) wall portion of the respective manifold). Each plate has one or more internal passageways between the ports 46 and 48.

Figure 2:
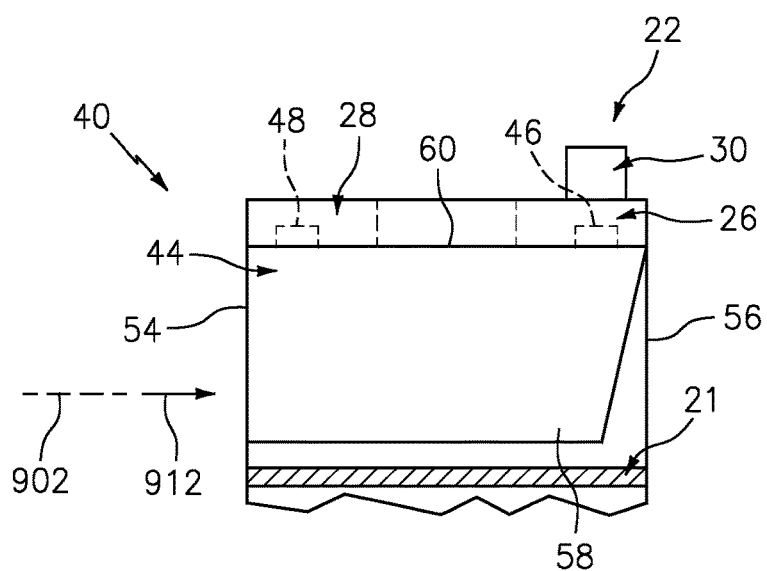
FIG. 2 is an axial side schematic view of the heat exchanger of FIG. 1.
Figure 3:
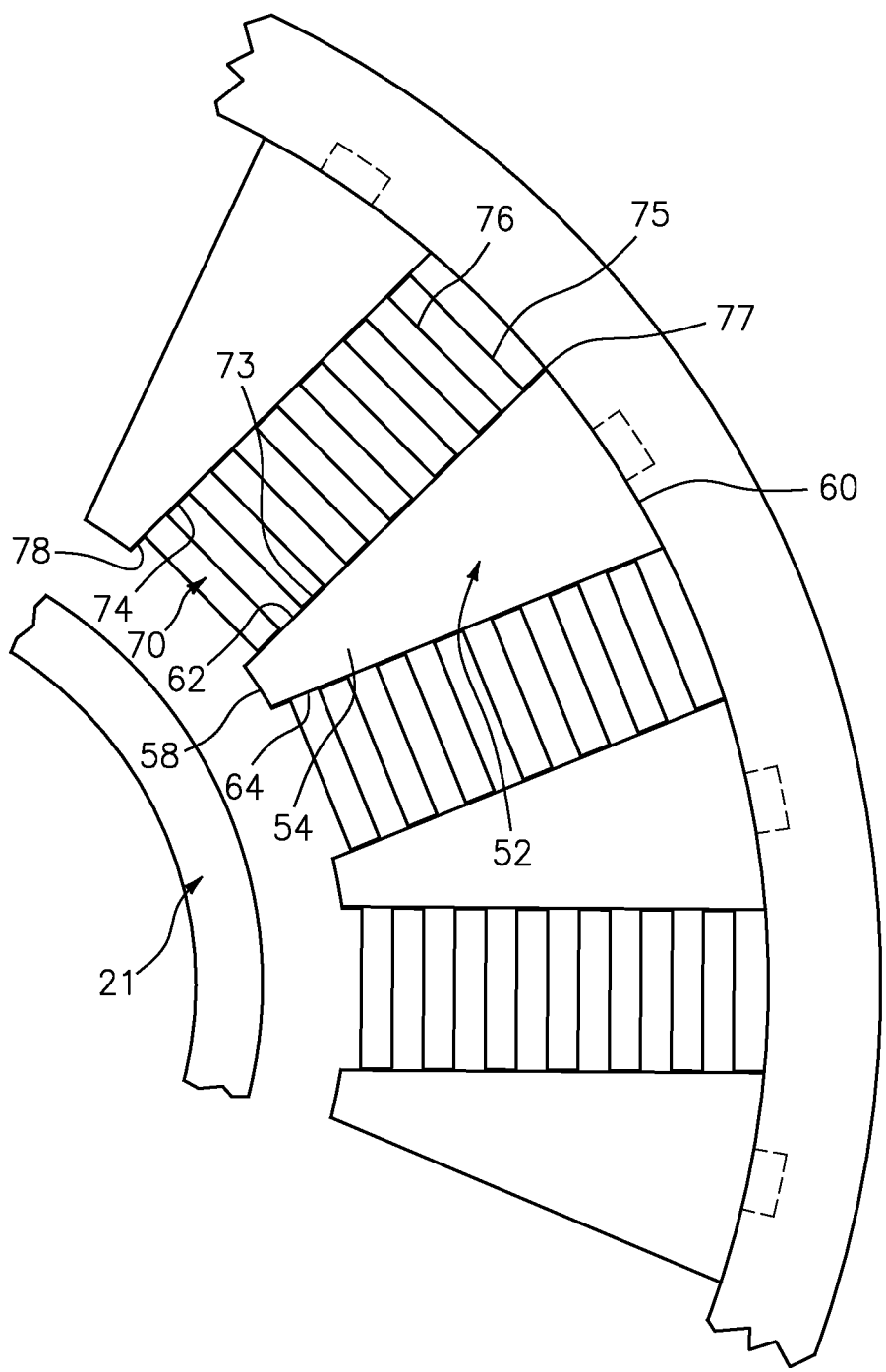
FIG. 3 is a schematic partial front view of the heat exchanger.
Figure 4:
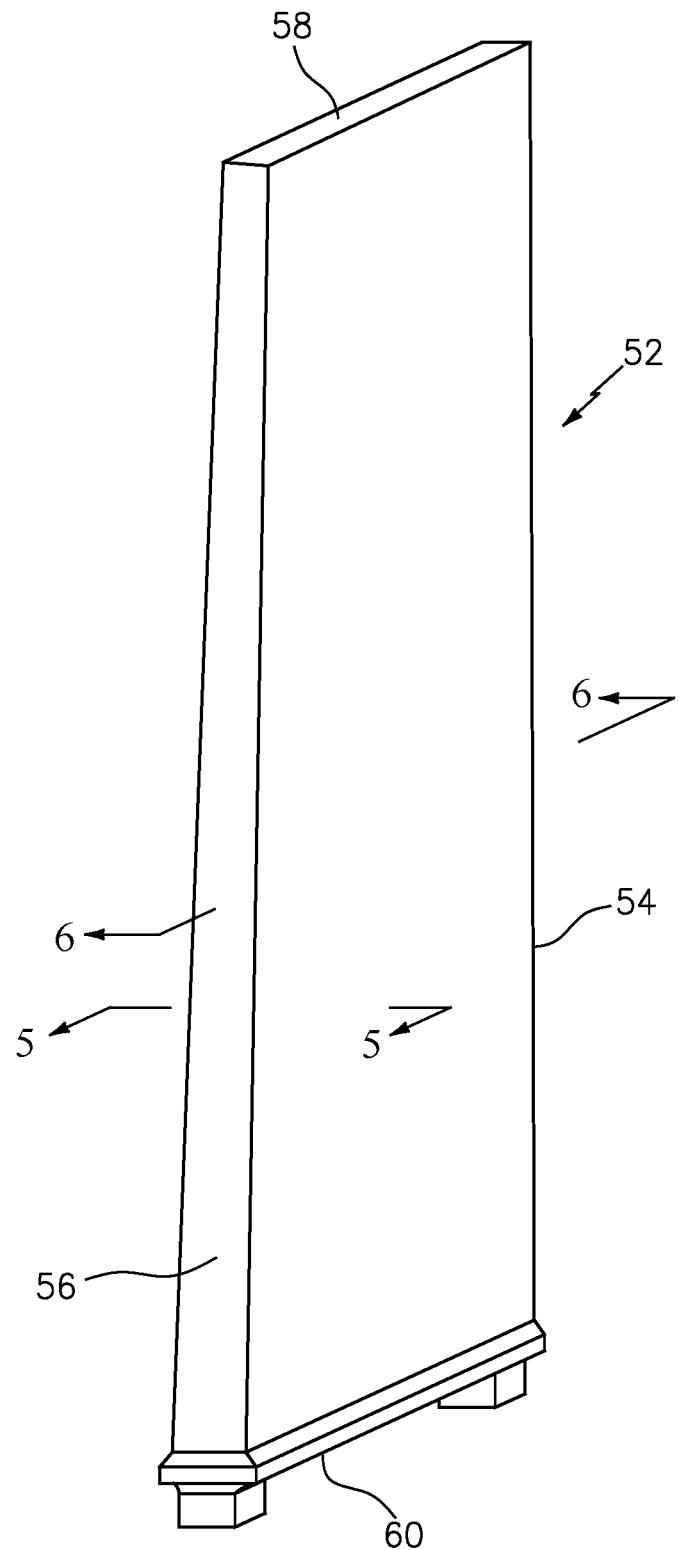
FIG. 4 is a view of a substrate of a plate of the heat exchanger.

Each plate 44 comprises a body or substrate 52 (FIG. 4—e.g., cast or additively manufactured alloy such as nickel-based superalloy) having a leading edge 54 (FIG. 2), a trailing edge 56, a distal edge (an inboard or inner diameter (ID) edge in the FIG. 2 heat exchanger) 58, a proximal edge (an outboard or outer diameter (OD) edge in the FIG. 2 heat exchanger) 60, a first lateral (circumferential (generally circumferentially facing) in the FIG. 2 heat exchanger) face 62 (FIG. 3) and a second lateral face 64.

As is discussed further below, the exemplary plates are essentially cantilevered from the manifold (lacking rigid coupling to static structure at the distal edges such as by having the distal edges free or not sufficiently rigidly coupled) and are thus subject to vibratory stimulus and resonance. To increase stiffness to combat resonance (e.g., by raising the natural frequency), the faces 62 and 64 may converge from the proximal edge 60 (the outer diameter edge in the illustrated orientation) toward the distal edge 58 (the ID edge in this example).

As is discussed below, one or both faces 62, 64 may bear fin arrays 70. The fins are separately formed (e.g., of folded sheetmetal—e.g., nickel-based superalloy) and secured (e.g., brazing, welding, diffusion bonding, and the like) to adjacent substrate(s) (generally see the '740 patent). As is discussed further below, exemplary fins are initially formed as square wave corrugations 72 (FIG. 3) of even height/amplitude whose troughs 73 or peaks 74 are secured to the associated face 62, 64. The corrugation has legs 75, 76 and extends from a first sectional end 77 (an outer diameter (OD) end in the example) to a second sectional end 78 (an inner diameter (ID) end in the example). Along the direction of the individual corrugations (streamwise of the ultimate second flow 912) the corrugation has a first end near the plate substrate upstream edge and a second end near the plate substrate downstream edge. In general, the term "plate" or "panel" may be applied at any of several levels of detail. It may identify a body or substrate of an assembly or the greater assembly or subassembly (e.g., a cast substrate plus one or more separately-attached fin arrays).

Figures 5, 5A:
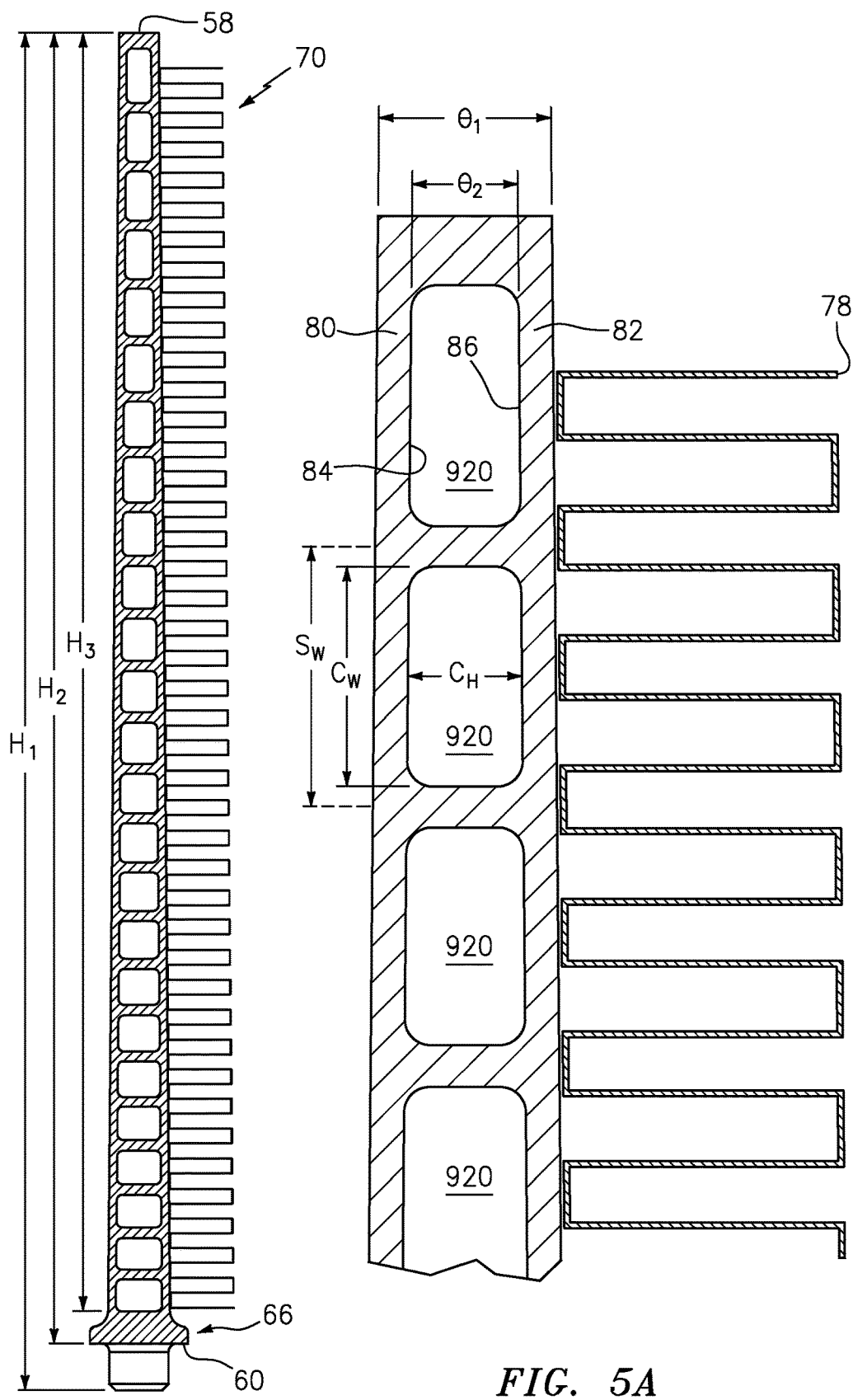
FIG. 5 is a transverse sectional view of the plate of the heat exchanger taken along line 5-5 in FIG. 4.
FIG. 5A is an enlarged view of a distal edge portion of the plate.

FIG. 5 shows the plate having an overall radial height $H_1$ and an exposed height $H_2$ (which ignores the height of any inlet or outlet fitting portion embedded/received in the manifold). Additionally, at the proximal edge, the plate has a flange 66. A height above the flange is $H_3$. Along a majority of these heights, the faces 62, 64 converge toward each other from the proximal edge 60 to the distal edge 58. An exemplary convergence angle $\theta_1$ is between 0.10° and 8.0°, more particularly, 0.25° and 5.0° or 0.25° and 2.0° or 0.50° and 2.0°. For plates mounted on a concave circular—section surface $\theta_1$ may be exactly equal to the circumferential angular on-center pitch of the plates or within a very small margin such as 0.05° to provide effective parallelism of adjacent plates. Depending on the diameter of the annulus being filled and the desired linear pitch, this angle can vary widely. That is, it may be more a result of geometry constraints than of tuning requirements. In exemplary embodiments, the angle $\theta_1$ may be in such range over a large fraction of one or more of such heights $H_1$, $H_2$, and $H_3$ (e.g., at least 40% or at least 50% or at least 60% or at least 70% or at least 80% or at least 90%). $\theta_1$ may be uniform along such range (e.g. an embodiment with a higher angle proximal portion being discussed below).

The interior passageways also generally converge in the proximal-to-distal direction. FIG. 5 shows such convergence at an angle $\theta_2$. In the FIG. 5 embodiment, $\theta_2$ is equal to $\theta_1$ so that sidewalls 80, 82 are effectively of uniform thickness. Respective sidewalls 80, 82 have inner surfaces 84 and 86. Exemplary $\theta_1$ and $\theta_2$ are 1.0°, more broadly 0.5° to 3.5° or 0.5° to 2.5°). FIG. 5A also identifies the cross-sectional width $C_W$ and the cross-sectional height $C_H$ of the passage leg 920. These features are further discussed below.

Figure 6:
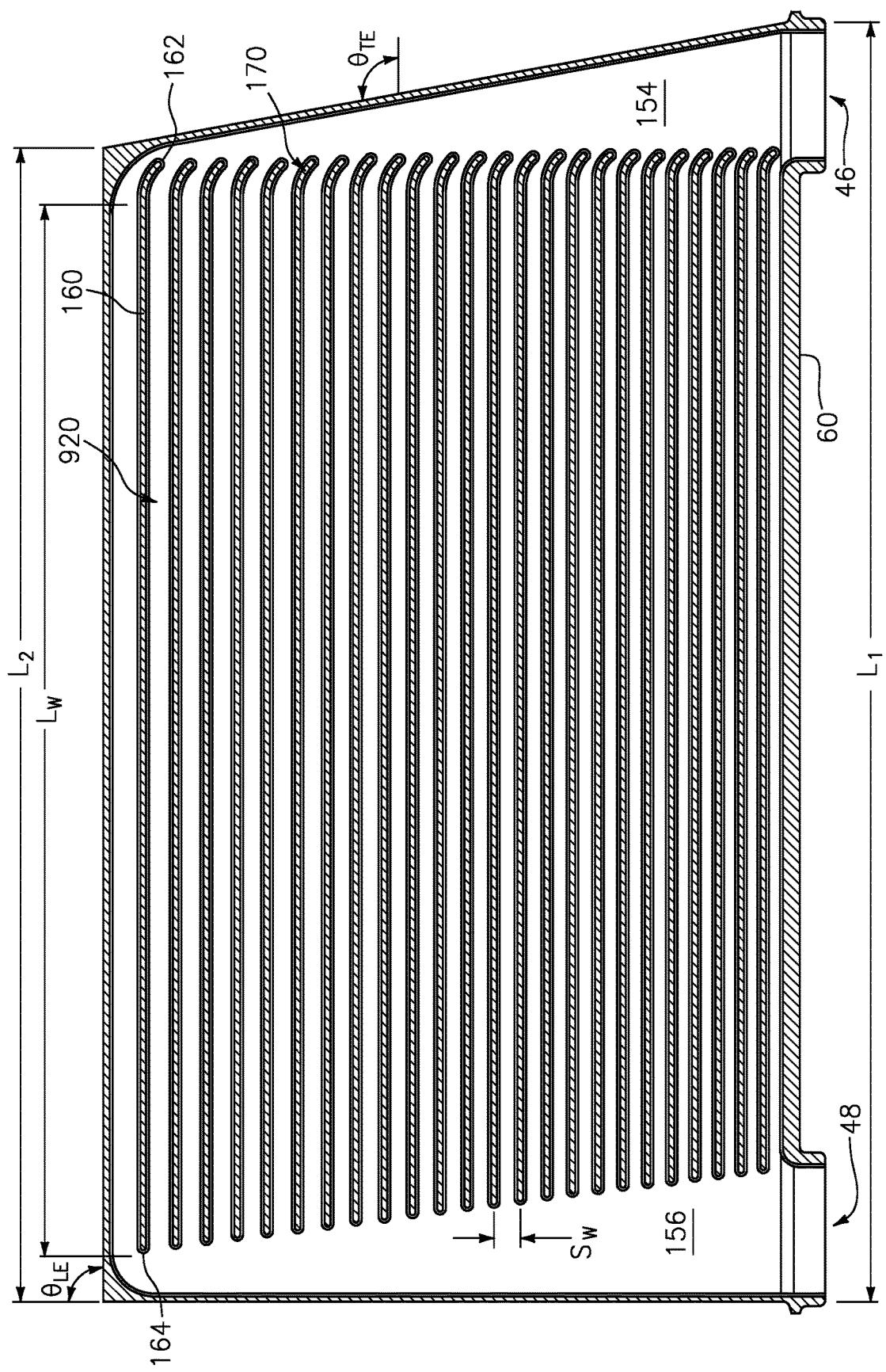
FIG. 6 is a longitudinal sectional view of the plate taken along line 6-6 in FIG. 4.

FIG. 6 shows each plate having an interior providing an associated flowpath branch/leg from the inlet 46 of the plate to the outlet 48. The exemplary inlets and outlets are along the proximal edge 60 (e.g., on plugs protruding from a flat main portion of the proximal edge and received in the respective manifold ports). The inlet 46 feeds an inlet plenum 154 adjacent/along the trailing edge while the outlet 48 is fed by a plenum 156 along the leading edge.

A generally radial array of passageway/flowpath legs (sublegs) 920 extend between the inlet plenum 154 and outlet plenum 156. The adjacent flowpath legs 920 are separated from each other by wall structures 160. Each wall structure 160 extends from a leading end 162 to a trailing end 164 (along the first flowpath). The exemplary wall structures 160 are straight with the exception of guide turns 170 extending a short distance from the leading edge 162 to guide air from a generally radially outward flow within the plenum 154 and shift that air generally axially. Although the outlet plenum 156 may have similar turns, modeling shows these to be less advantageous at the outlet plenum. The wall structures 160 span between adjacent interior faces 84, 86 (FIG. 5A).

The wall structures 160 may divide internal flows into smaller passages, thereby increasing surface area, more equally distributing, and/or accelerating internal flows. They may also tie the walls 80, 82 of the plate together to prevent ballooning under elevated temperatures and pressures.

The exemplary inlet plenum 154 converges in axial dimension from proximal to distal or downstream along the first flowpath. Similarly, the exemplary outlet plenum 156 diverges in axial dimension from distal to proximal or downstream along the first flowpath toward the outlet 48. Such respective convergence and divergence may reduce internal losses and prevents separation of flow.

FIG. 6 also shows several other geometric considerations. Wall 160 straight portion length $L_W$ and on-center spacing $S_W$ are shown. An angle $\theta_{LE}$ of the leading edge relative to the downstream direction and an angle $\theta_{TE}$ of the trailing edge relative to the downstream direction are shown. Plate root length $L_1$ and plate tip length $L_2$ are shown.

The interior of the plate may optionally include integral surface enhancement features (not shown—see the '091 application).

A uniform pitch or spacing $S_W$ of adjacent passages 920 will result in uniform surface areas for heat transfer (assuming uniform width dividing walls 160). However, this will cause larger flow areas near the proximal edge (counterproductive for flow distribution as discussed in the '091 application). More desirable is something closer to a uniform flow area through adjacent passages. This will result in a smaller spacing $S_W$ near the proximal edge relative to the larger spacing $S_W$ at the distal edge (e.g., a continuous progressive increase). Relative to a uniform spacing, this further raises the natural frequency of the plate by stiffening the proximal portion of the plate and/or lightening the distal portion of the plate.

One aspect of the convergence of the faces 62 and 64 is that the angle θi may be chosen, in view of the radius of curvature of the inner diameter surface of the manifold structure and circumferential on-center spacing of the plates so that each face 62 is parallel to the adjacent face 64 of the next adjacent plate (if any) and vice versa. This parallelism allows the constant amplitude wave fin structure to be used to span the gap between adjacent plate substrates with peaks secured to one substrate and troughs secured to the other.

When parallelism is not a consideration, other angle variations are possible such as having a continuously varying angle (e.g., a slight concavity in the faces 62, 64). Additionally, other fin structures may be included including free-ended fins cut from such wave form stock. For example, a configuration with wire electrodischarge machined (EDM) fins is shown in copending U.S. Patent Application No. 62/963,068 (the '068 application), filed Jan. 19, 2020, and entitled "Aircraft Heat Exchanger Finned Plate Manufacture", the disclosure of which is incorporated by reference herein in its entirety as if set forth at length.

Figures 7, 7A:
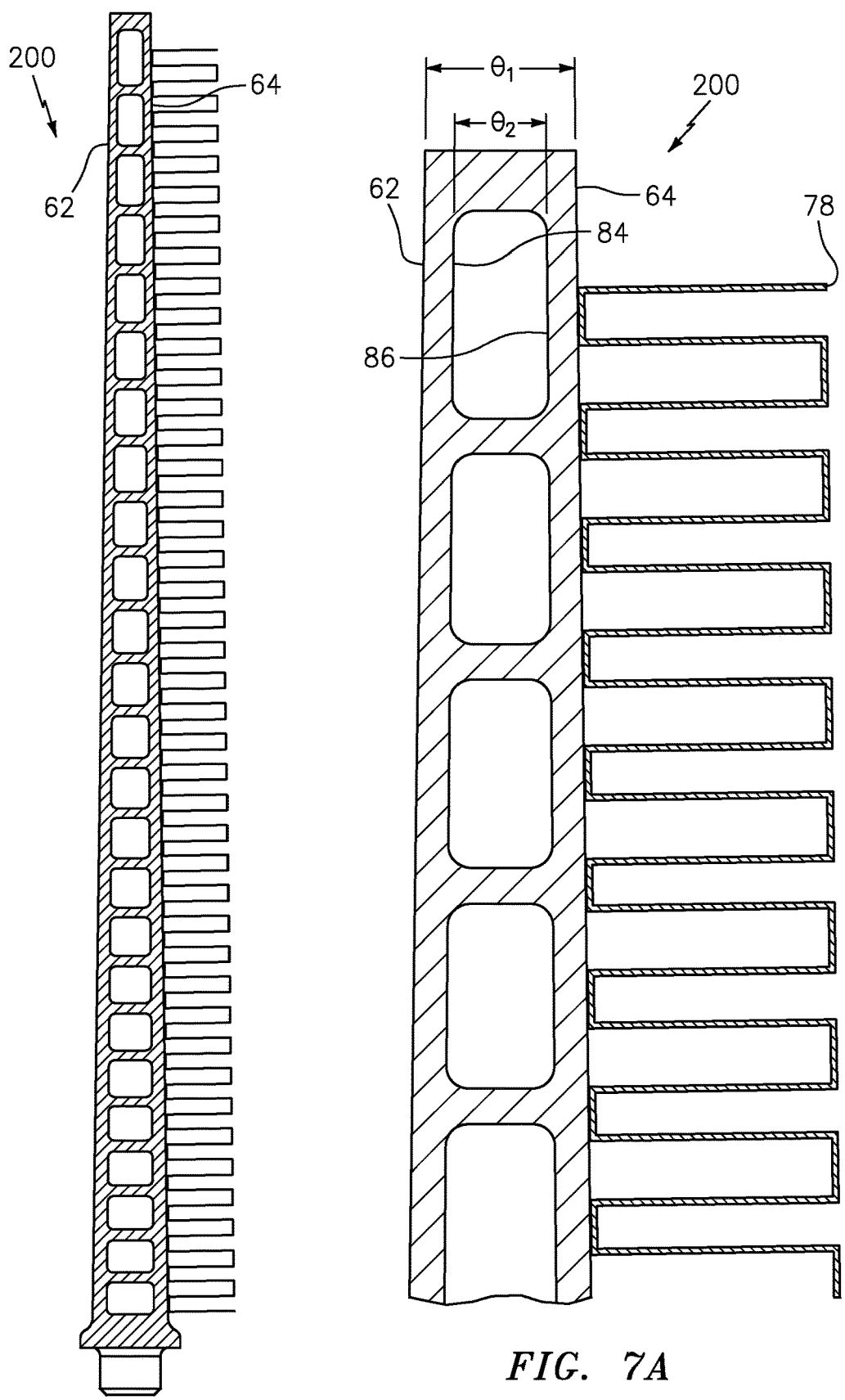
FIG. 7 is a transverse sectional view of a first alternative plate of the heat exchanger.
FIG. 7A is an enlarged view of a distal edge portion of the first alternative plate.

FIG. 7 shows a further plate 200 otherwise similar to the plate 44 except that the interior faces 84 and 86 taper somewhat less than the taper of the faces 62 and 64 ($\theta_1 > \theta_2$) (exemplary $\theta_1$ 1.5° and $\theta_2$ 1.0°) so that the wall thickness generally decreases in the proximal-to-distal direction. Otherwise, $\theta_1$ and other considerations may be similar to that of the plate 44. Exemplary $\theta_1$ is at least 0.25° greater than $\theta_2$, more generally 0.25° to 3.0° or 0.30° to 1.5° with an example of 0.50°. This also highlights that, even where $\theta_1$ is constant, adjacent $\theta_2$ need not be.

Figure 8:
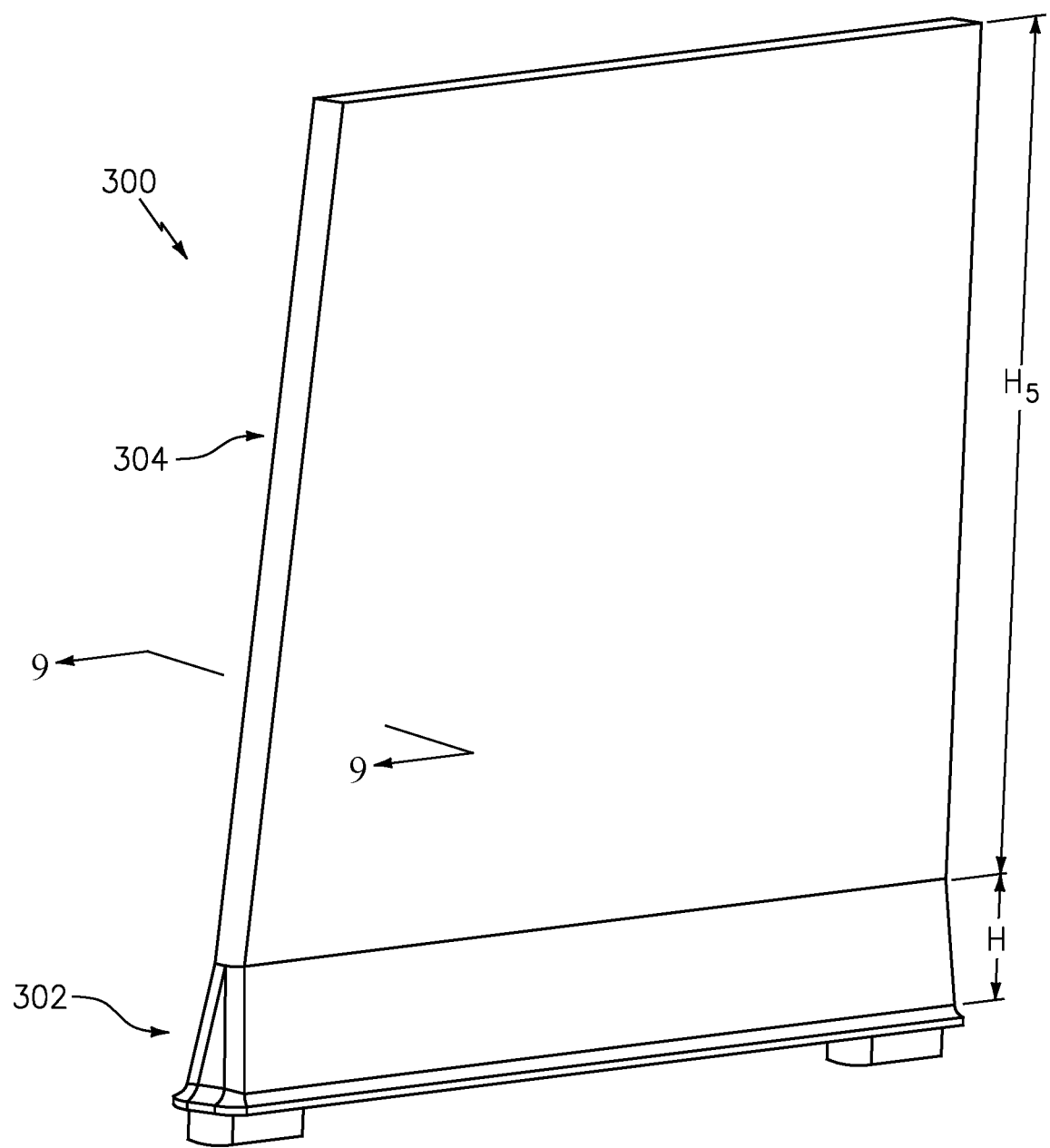
FIG. 8 is a view of a substrate of a plate of a second alternative plate.

FIGS. 8 and 9 show an alternate configuration of a plate 300 in which a base/proximal portion 302 (height $H_4$ measured from the distal end of the flange 66) of the substrate rapidly tapers but transitions to a distal portion 304 (height $H_5$) that is less tapering. Exemplary $H_4$ is 5.0% to 50.0% of $H_2$ (but the upper end of that range could go to 100%), more particularly 8.0% to 20.0% or 10.0% to 15.0%. FIG. Along that proximal portion 302, exemplary $\theta_1$ is 1.0° to 30.0°, more particularly, 5.0° to 20.0° or 10.0° to 18.0°. In the exemplary embodiment, the distal portion 304 does not taper at all Alternative distal portions 304 may taper in similar fashion to the embodiments above.

Figure 11:
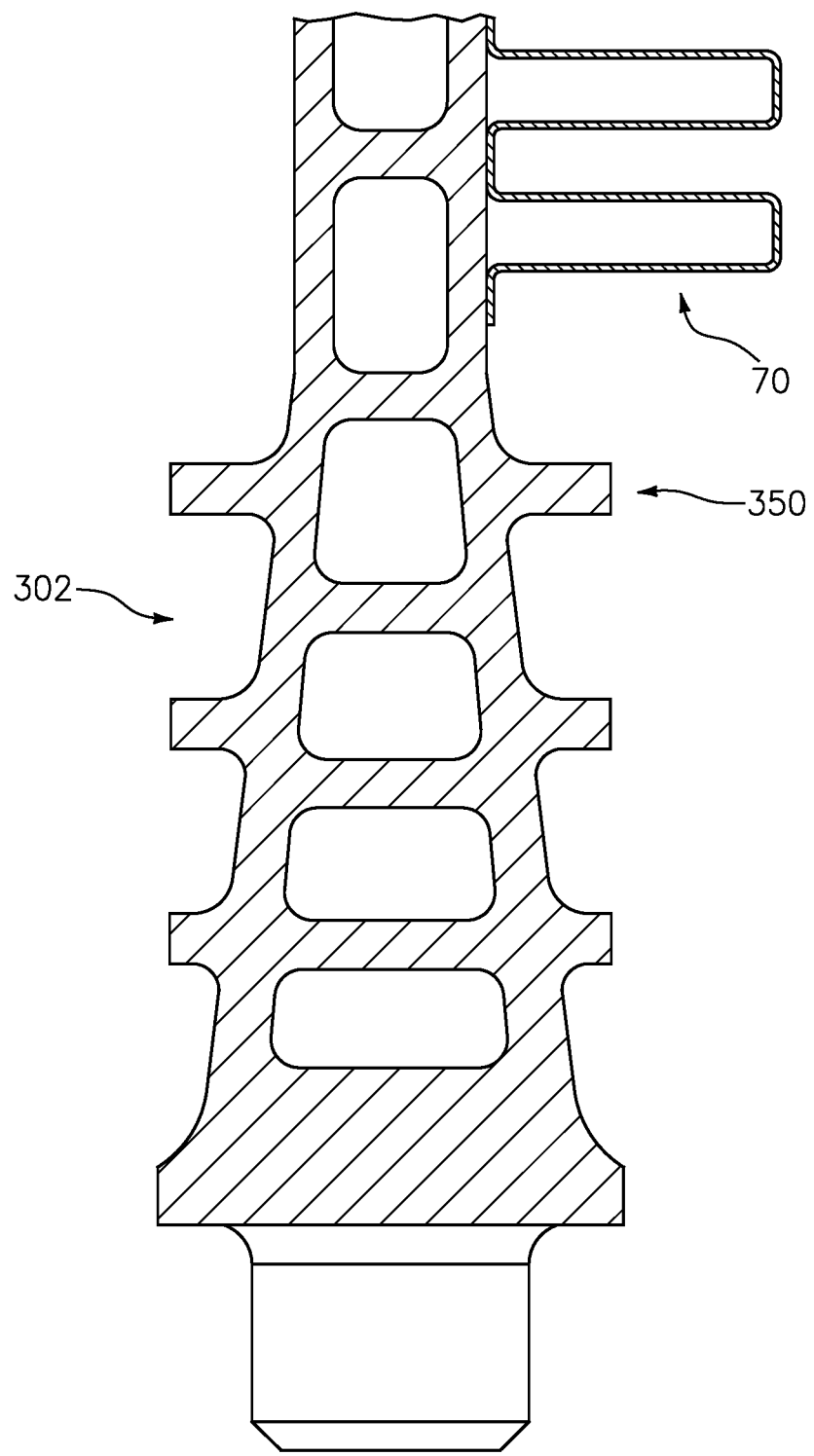
FIG. 11 is an enlarged view of a proximal edge portion of a third alternative plate.

A particular situation wherein such plates 300 may be particularly useful is with a flat manifold wherein the adjacent faces of two plates along the distal portion 304 are parallel and may feature a wave-form fin structure joining the two as discussed above. The proximal portion 302 may still provide stiffness/resonance benefits. FIG. 11 is another example of one such situation. Because the fins do not extend to the proximal sections, the proximal sections themselves may bear integral fins 350 and may bear chevron or other trip strips (not shown).

Figure 10:
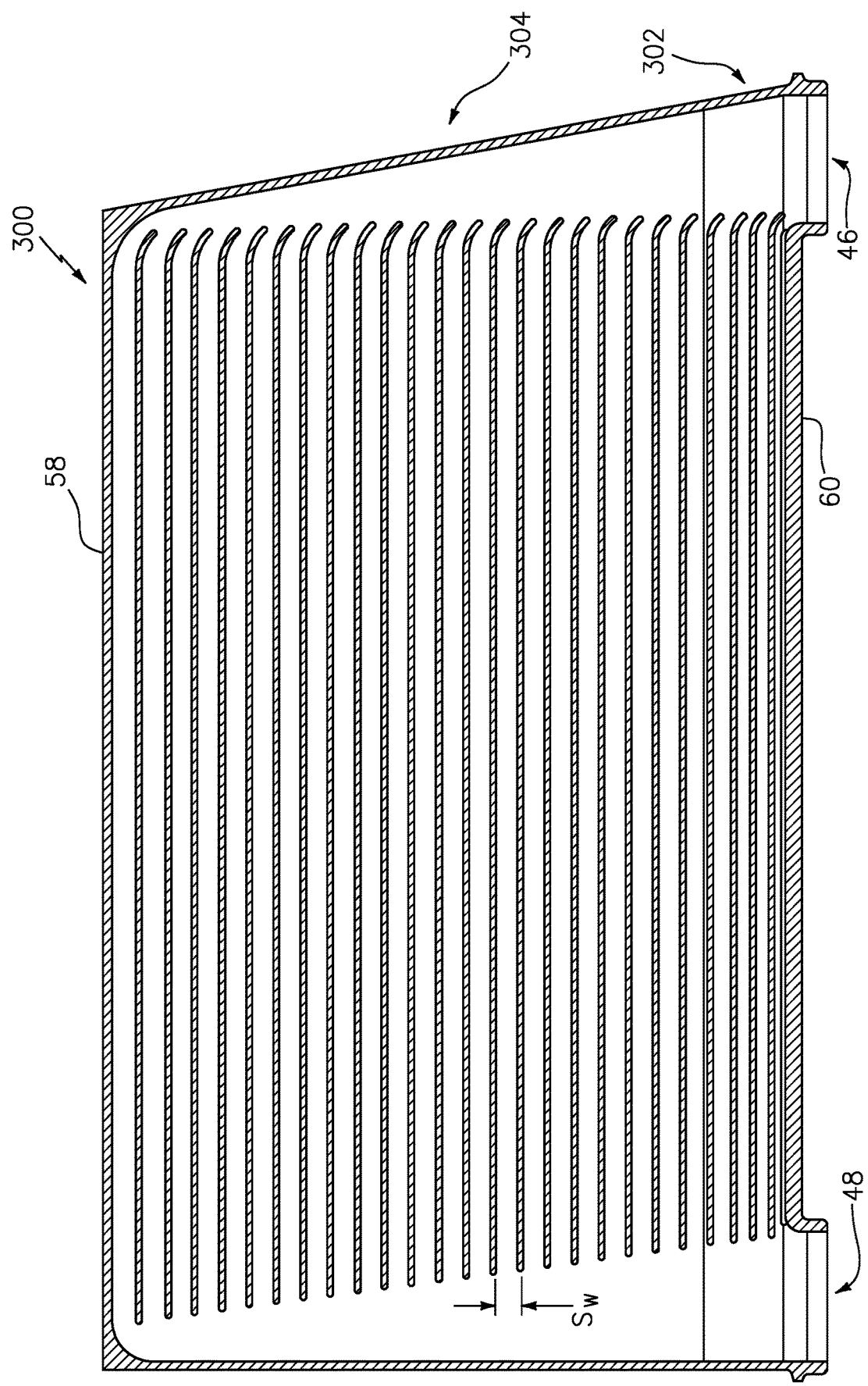
FIG. 10 is a longitudinal sectional view of the second alternative plate taken along line 10-10 in FIG. 8.

In the FIG. 10 example, of interior passages, passage cross-sectional areas are the same as each other due to a progressive net 40% reduction in spacing $S_W$ from the fifth passage (standard size shared with remaining passages distally thereof) to the first passage (smallest—near the proximal edge). The same stiffening benefit discussed above applies.

Figure 12:
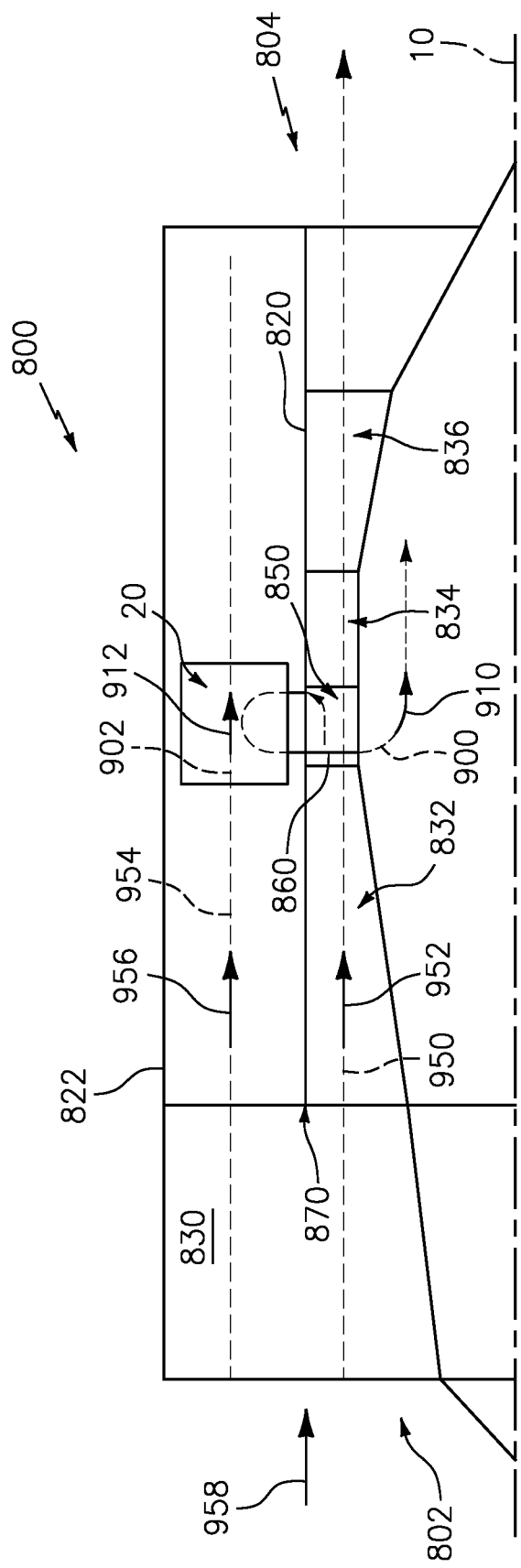
FIG. 12 is a schematic axial half section view of a gas turbine engine including the heat exchanger.

FIG. 12 schematically shows a gas turbine engine 800 as a turbofan engine having a centerline or central longitudinal axis 10 and extending from an upstream end at an inlet 802 to a downstream end at an outlet 804. The exemplary engine schematically includes a core flowpath 950 passing a core flow 952 and a bypass flowpath 954 passing a bypass flow 956. The core flow and bypass flow are initially formed by respective portions of a combined inlet airflow 958 divided at a splitter 870.

A core case or other structure 820 divides the core flowpath from the bypass flowpath. The bypass flowpath is, in turn, surrounded by an outer case 822 which, depending upon implementation, may be a fan case. From upstream to downstream, the engine includes a fan section 830 having one or more fan blade stages, a compressor 832 having one or more sections each having one or more blade stages, a combustor 834 (e.g., annular, can-type, or reverse flow), and a turbine 836 again having one or more sections each having one or more blade stages. For example, many so-called two-spool engines have two compressor sections and two turbine sections with each turbine section driving a respective associated compressor section and a lower pressure downstream turbine section also driving the fan (optionally via a gear reduction). Yet other arrangements are possible.

FIG. 12 shows the heat exchanger 20 positioned in the bypass flowpath so that a portion of the bypass flowpath 954 becomes the second flowpath 902 and a portion of the bypass flow 956 becomes the second airflow 912.

The exemplary first airflow 910 is drawn as a compressed bleed flow from a diffuser case 850 between the compressor 832 and combustor 834 and returned radially inwardly back through the core flowpath 950 via struts 860. Thus, the flowpath 900 is a bleed flowpath branching from the core flowpath.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A heat exchanger for providing heat transfer between a first flow along a first flowpath and a second flow along an arcuate second flowpath, the heat exchanger comprising:
   an inlet manifold having at least one inlet port and at least one outlet port;
   an outlet manifold having at least one outlet port and at least one inlet port; and
   at least one plate bank comprising:
      a plurality of plates, each plate comprising a body mounted to the inlet manifold and the outlet manifold and having:
         at least one inlet port along the first flowpath and at least one outlet port along the first flowpath;
         a first face and a second face opposite the first face;
         a leading edge along the second flowpath and a trailing edge along the second flowpath;
         an inner diameter edge; and
         an outer diameter edge, a thickness of the body between the first face and second face tapering along a first region in an inward radial direction from the outer diameter edge to the inner diameter edge; and
      fin arrays between adjacent said plates spanning between the first face in the first region of one said plate and the second face in the first region of the other said plate, the fin arrays each formed by a wave form sheet metal piece having essentially uniform wave amplitude.

2. The heat exchanger of claim 1 wherein, for each plate of the plurality of plates:
   the at least one inlet port and at least one outlet port are along one of the inner diameter edge and the outer diameter edge.

3. The heat exchanger of claim 1 wherein, for each plate of the plurality of plates:
   the inlet manifold and outlet manifold are portions of a combined manifold structure.

4. The heat exchanger of claim 3 wherein:
   the combined manifold structure is arcuate having a concave inner diameter face, the plates mounted to the inner diameter face.

5. The heat exchanger of claim 4 wherein, for each plate of the plurality of plates:
   the at least one inlet port and at least one outlet port are along the outer diameter edge.

6. The heat exchanger of claim 1 wherein, for each plate of the plurality of plates:
   the at least one inlet port and at least one outlet port are along the outer diameter edge.

7. A gas turbine engine including the heat exchanger of claim 1 and further comprising:
   a bypass flowpath forming the second flowpath.

8. A method for using the heat exchanger of claim 1, the method comprising:
   passing the first flow along the first flowpath; and
   passing the second flow along the second flowpath to transfer said heat from the first flow to the second flow.

9. The method of claim 8 wherein:
   the second flow passes along the plate first faces and plate second faces.

10. The heat exchanger of claim 1 wherein, for each plate of the plurality of plates:
    along at least 8.0% of a height between the outer diameter edge and the inner diameter edge, the first face and the second face converge at a first angle of at least 0.25°.

11. The heat exchanger of claim 10 wherein, for each plate of the plurality of plates:
    said at least 8.0% of a height between the outer diameter edge and the inner diameter edge is a continuous zone and the first angle is uniform along said continuous zone.

12. The heat exchangers of claim 10 wherein, for each plate of the plurality of plates:
    the plate has a plurality of interior walls separating legs of the at least one passageway at a progressively increasing spacing from outer diameter to inner diameter.

13. The heat exchanger of claim 10 wherein, for each plate of the plurality of plates:
    along at least 50% of a height between the outer diameter edge and the inner diameter edge, the first face and the second face converge at a first angle of between 0.25° and 5.0°.

14. The heat exchanger of claim 10 wherein, for each plate of the plurality of plates, the passageway comprises:
    an inlet plenum extending from the at least one inlet port of the plate;
    an outlet plenum extending to the at least one outlet port of the plate; and
    a plurality of legs in parallel between the inlet plenum and the outlet plenum.

15. The heat exchanger of claim 14 wherein, for each plate of the plurality of plates:
    the inlet plenum is adjacent the trailing edge; and
    the outlet plenum is adjacent the leading edge.

16. The heat exchanger of claim 1 wherein, for each plate of the plurality of plates:
    along an outer diameter portion, the first face and the second face converge at a first angle; and
    along an inner diameter portion, the first face and the second face converge at a second angle less than the first angle.

17. The heat exchanger of claim 16 wherein, for each plate of the plurality of plates:
    along the outer diameter portion, the body has integral fins; and
    along the inner diameter portion, the plate has sheetmetal fins secured to the body.

18. The heat exchanger of claim 16 wherein, for each plate of the plurality of plates:
    the first angle is at least 0.25° greater than the second angle.

19. The heat exchanger of claim 16 wherein, for each plate of the plurality of plates:
    the second angle is 0.0°.

20. The heat exchanger of claim 16 wherein, for each plate of the plurality of plates:
    the outer diameter portion extends for a height of at least 8% of a height from the outer diameter edge.

21. The heat exchangers of claim 16 wherein, for each plate of the plurality of plates:
    along the outer diameter portion, the plate has a plurality of walls at a progressively increasing spacing from outer diameter to inner diameter.

22. The heat exchangers of claim 21 wherein, for each plate of the plurality of plates:
    along the inner diameter portion, the plate has a plurality of walls at a constant spacing.

23. The heat exchanger of claim 16 wherein, for each plate of the plurality of plates, the body comprises a cast substrate.

* * * * *